3,759,895
BENZOTHIAZOLYL-AZO-INDOLE COMPOUNDS

Clarence A. Coates, Jr., and Max A. Weaver, Kingsport, Tenn., assignors to Eastman Kodak Company, Rochester, N.Y.
No Drawing. Filed Dec. 20, 1971, Ser. No. 210,173
Int. Cl. C09b 29/36
U.S. Cl. 260—158                                    7 Claims

ABSTRACT OF THE DISCLOSURE

Monoazo compounds, which exhibit excellent fastness and dyeability properties on polyamide textile materials on which the compounds produce reddish-yellow to orange shades, consist of a 2-benzothiazolyl diazo component which may be substituted with certain alkyl, alkoxy, cyclohexoxy, aryloxy, halogen and acylamido substituents and an N-carbamoylalkyl- or N-acylamido-alkyl-indole coupling component.

---

This invention concerns certain novel benzothiazolylazo compounds and polyamide textile materials dyed therewith.

The novel compounds of the invention have the general formula (I)

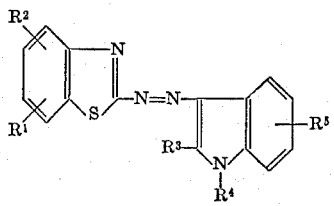

wherein $R^1$ is hydrogen, lower alkyl; lower alkyl substituted with hydroxy, carbamoyl, halogen, lower alkylsulfonyl, lower alkylsulfonamido, aryl, lower alkoxy,

—NHCO—$R^6$ or —OCO—$R^6$; lower alkoxy, lower alkoxy substituted with hydroxy, carbamoyl, halogen, lower alkylsulfonyl, lower alkylsulfonamido, aryl, lower alkoxy,

—NHCO—$R^6$ or —OCO—$R^6$; cyclohexoxy; lower alkylcyclohexoxy; aryloxy; halogen; thiocyano or lower alkanoylamino;
$R^2$ is hydrogen or, when $R^1$ is hydrogen, lower alkyl or lower alkoxy, $R^2$ also can be lower alkyl, lower alkoxy or halogen
$R^3$ is aryl;
$R^4$ is —$(CH_2)_n$—$CONR^7R^8$, —$CH_2CH_2CH_2NHCO$—$R^6$, lower alkylsulfonamidopropyl or arylsulfonamidopropyl; and
$R^5$ is hydrogen, lower alkyl, lower alkoxy or halogen;
in which each aryl group is phenyl or phenyl substituted with lower alkyl, lower alkoxy or halogen; $R^6$ is hydrogen; lower alkyl; lower alkyl substituted with hydroxy, lower alkoxy, lower alkylthio, lower alkanoyloxy, cyano, carbamoyl, aryl, halogen, aryloxy or lower alkylsulfonyl; cyclohexyl; lower alkylcyclohexyl; lower alkoxy; furyl; lower alkenyl; or aryl; $n$ is 2 or 3; $R^7$ individually is hydrogen, lower alkyl, cyclohexyl, aryl; hydroxymethyl, benzyl or 1,1-dimethyl-3-oxobutyl; $R^8$ individually is hydrogen or, when $R^9$ is hydrogen or lower alkyl, $R^8$ also can be lower alkyl; and $R^7$ and $R^8$ collectively are pentamethylene or ethyleneoxyethylene.

Our novel compounds are useful for dyeing synthetic textile materials such as cellulose acetate, polyester and polyamide fibers on which the azo compounds exhibit excellent fastness and dyeability properties. The novel azo compounds are particularly valuable for producing reddish-yellow to orange shades on polyamide fibers on which the azo compounds exhibit good to excellent fastness to light and washing and improved dyeability properties including build-up, migration and crockfastness. The compounds of the invention are suitable for dyeing polyamide carpet where brightness, migration, fastness to light and crocking and color yield are of great importance.

As used herein to describe an alkyl group or a group containing an alkyl moiety, "lower" designates a carbon content of one to about four carbon atoms. For example, the alkyl groups and the alkyl moieties of the alkylsulfonyl, alkoxy and alkanoylamino groups set forth in the definitions of $R^1$, $R^2$, $R^3$, $R^4$ and/or $R^6$ can be methyl, ethyl, propyl, isopropyl, butyl, isobutyl, etc. Chlorine and bromine are typical of the halogen atoms which can be present on the novel azo compounds. As used herein, "aryl" means unsubstituted phenyl or phenyl substituted with lower alkyl, lower alkoxy or halogen, e.g., tolyl, anisyl, ethoxyphenyl, bromophenyl, dichlorophenyl, etc. The substituents recited generically in the definitions of $R^1$ through $R^8$ are well known to those skilled in the art.

A group of our novel compounds which, because of their good cost:performance ratio, are particularly valuable for dyeing polyamide fibers have the formula (II)

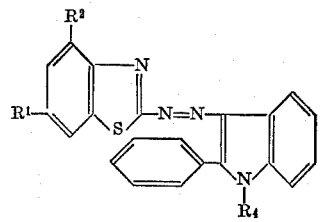

wherein $R^1$ is hydrogen, lower alkyl, lower alkoxy, lower alkanoylamino, phenoxy, chlorine, bromine, lower alkoxyethoxy, lower alkoxypropoxy, lower alkylsulfonamidoethyl, lower alkylsulfonamidopropyl, lower alkanoylaminoethyl or lower alkanoylaminopropyl;
$R^2$ is hydrogen or, when $R^1$ is hydrogen, lower alkyl or lower alkoxy, $R^2$ also can be lower alkyl, lower alkoxy, chlorine or bromine; and
$R^4$ is carbamoylethyl, lower alkanoylaminopropyl or lower alkoxycarbonylaminopropyl.

The azo compounds of Formula II in which $R^1$ is methyl, methoxy or ethoxy; $R^2$ is hydrogen; and $R^4$ is carbamoylethyl or acetamidoethyl are especially preferred.

The novel azo compounds are prepared by diazotizing an amine having the formula (III)

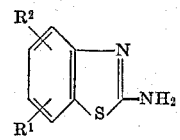

and coupling the resulting diazonium salt with a coupler having the formula (IV)

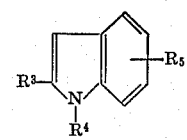

The amines of Formula III are prepared according to published techniques. For example, an aniline compound can be reacted with a thiocyanate in the presence of bromine and acetic acid to yield the corresponding o-thiocyanatoaniline which then is treated with alkali to effect ring closure. Another technique that can be used is that of reacting an aniline compound with a thiocyanate in the presence of a mineral acid to obtain an arylthiourea which is converted to the 2-aminobenzothiazole by treatment with bromine.

The couplers of Formula IV also are synthesized by known procedures using known or readily-obtainable intermediates. For example, an N-cyanoalkyl-2-arylindole can be hydrolyzed in the presence of sulfuric acid to yield the corresponding N-carbamoylethyl compound. The carbamoyl group can be hydrogenated in the presence of ammonia and a nickel catalyst to yield the aminoalkyl compound which then is treated with a variety of acylating agents to yield N-acylaminoalkyl-2-arylindole couplers. These and additional techniques are described in detail in the literature.

The azo compounds of the invention, their preparation and their use are further illustrated by the following examples.

EXAMPLE 1

N-(2-cyanoethyl)-2-phenylindole (46.0 g.) in ethanol (200 ml.) is hydrogenated in the presence of Raney nickel (10 g.) and ammonia (25 g.) at 100° C. and 1500 p.s.i. hydrogen pressure until the hydrogen uptake ceases. The Raney nickel is removed by filtration and the ethanol is evaporated to yield 42.0 g. of oily product which consists essentially of N-(3-aminopropyl)-2-phenylindole.

EXAMPLE 2

N-(3-aminopropyl)2-phenylindole (42.0 g.) is dissolved in benzene (100 ml.). Acetic anhydride (18 ml.) is added dropwise, and then the solution is refluxed for 2 hours. After cooling, the reaction mixture is drowned into hexane. The product, N-(3-acetamidopropyl)-2-phenylindole (44.5 g.) is collected by filtration, washed with hexane and dried in air. It melts at 127–129° C.

EXAMPLE 3

N-(2-cyanoethyl)-2-phenylindole (16.0 g.) is added portionwise with stirring to 80 ml. of conc. $H_2SO_4$ at about 25° C. The reaction mixture is allowed to stand at room temperature for 24 hours and then drowned into ice-water mixture. The mixture is partially neutralized by adding conc. $NH_4OH$. The product, N-(2-carbamoylethyl)-2-phenylindole (13.5 g.), is collected by filtration, washed with water and dried in air.

EXAMPLES 4–13

To 50 ml. of conc. $H_2SO_4$ is added 7.2 g. $NaNO_2$ portionwise with stirring. The solution is cooled and 100 ml. of 1:5 acid is added below 20° C. The mixture is cooled and 2-amino-6-methoxybenzothiazole (18.0 g.) is added below 20° C., followed by 100 ml. 1:5 acid, all below 5° C. The reaction is stirred at 0–5° C. for 2 hours. The following couplers (.01 mole) are dissolved in 40 ml. of 1:5 acid:

N-(2-carbamoylethyl)-2-phenylindole (Example 4)
N-(3-acetamidopropyl)-2-phenylindole (Example 5)
N-(3-ethoxycarbonylaminopropyl)-2-phenylindole (Example 6)
N-(3-propionamidopropyl)-2-phenylindole (Example 7)
N-(3-methanesulfonamidopropyl)-2-phenylindole (Example 8)
N-(3-chloroacetamidropyropyl)-2-phenylindole (Example 9)
N-(3-iso-butyramidopropyl)-2-phenylindole (Example 10)
N-(3-cyclohexylcarbonylaminopropyl)-2-phenylindole (Example 11)
N-(3-hydroxyacetamidopropyl)-2-phenylindole (Example 12)
N-(3-acetamidopropyl)-5-methyl-2-phenylindole (Example 13).

To each chilled coupler solution is added a .01 mole aliquot of diazonium solution. The coupling mixtures are buffered by the addition of ammonium acetate and allowed to stand for one hour. The azo compounds thus obtained are precipitated by the addition of water, collected by filtration, washed with water and dried in air. If needed, the azo compounds are purified by slurrying in hot methanol, cooling, filtering and washing with cold methanol. These ten azo compounds produce bright, level orange shades on polyamide fibers and exhibit good fastness to light.

The azo compounds set forth in the following table conform to Formula I and are prepared according to the procedures described hereinabove. The compounds which have an alkoxy substituent on the benzothiazolyl diazo component produce orange shades on polyamide fibers whereas the remaining compounds produce reddish-yellow shades. Table Examples 4–13 describe the compounds prepared in preceding Examples 4–13.

TABLE

| Ex. No. | $R^1$, $R^2$ | $R^3$ | $R^4$ | $R^5$ |
| --- | --- | --- | --- | --- |
| 4 | 6-$OCH_3$ | —$C_6H_5$ | —$CH_2CH_2CONH_2$ | H |
| 5 | 6-$OCH_3$ | —$C_6H_5$ | —$(CH_2)_3NHCOCH_3$ | H |
| 6 | 6-$OCH_3$ | —$C_6H_5$ | —$(CH_2)_3NHCOOC_2H_5$ | H |
| 7 | 6-$OCH_3$ | —$C_6H_5$ | —$(CH_2)_3NHCOC_2H_5$ | H |
| 8 | 6-$OCH_3$ | —$C_6H_5$ | —$(CH_2)_3SO_2CH_3$ | H |
| 9 | 6-$OCH_3$ | —$C_6H_5$ | —$(CH_2)_3COCH_2Cl$ | H |
| 10 | 6-$OCH_3$ | —$C_6H_5$ | —$(CH_2)_3COCH_2CH(CH_3)_2$ | H |
| 11 | 6-$OCH_3$ | —$C_6H_5$ | —$(CH_2)_3COC_6H_{11}$ | H |
| 12 | 6-$OCH_3$ | —$C_6H_5$ | —$(CH_2)_3COCH_2OH$ | H |
| 13 | 6-$OCH_3$ | —$C_6H_5$ | —$(CH_2)_3COCH_3$ | 5-$CH_3$ |
| 14 | H | —$C_6H_5$ | —$CH_2CH_2CONH_2$ | H |
| 15 | H | —$C_6H_5$ | —$(CH_2)_3NHCOCH_3$ | H |
| 16 | 4-$CH_3$ | —$C_6H_5$ | —$(CH_2)_3NHCOCH_3$ | H |
| 17 | 5-$CH_3$ | —$C_6H_5$ | —$(CH_2)_3NHCOCH_3$ | H |
| 18 | 6-$CH_3$ | —$C_6H_5$ | —$(CH_2)_3NHCOCH_3$ | H |
| 19 | 6-$CH_3$ | —$C_6H_5$ | —$CH_2CH_2CONH_2$ | H |
| 20 | 4,6-di-$CH_3$ | —$C_6H_5$ | —$CH_2CH_2CONH_2$ | H |
| 21 | 4 $CH_2CH_2OH$ | —$C_6H_5$ | —$CH_2CH_2CONH_2$ | H |
| 22 | 6-$OCH_2CH_2OCH_3$ | —$C_6H_5$ | —$(CH_2)_3NHCOCH_3$ | H |
| 23 | 6-Cl | —$C_6H_5$ | —$(CH_2)_3NHCOCH_3$ | H |
| 24 | 6-$NHCOCH_3$ | —$C_6H_5$ | —$(CH_2)_3NHCOCH_3$ | H |
| 25 | 6-$CH_2CH_2NHCOCH_3$ | —$C_6H_5$ | —$(CH_2)_3NHCOCH_3$ | H |
| 26 | 6-$CH_2CH_2NHSO_2CH_3$ | —$C_6H_5$ | —$(CH_2)_3NHCOCH_3$ | H |
| 27 | 6-$CH_2CONH_2$ | —$C_6H_5$ | —$(CH_2)_3NHCOCH_3$ | H |
| 28 | 6-$OC_6H_5$ | —$C_6H_5$ | —$(CH_2)_3NHCOCH_3$ | H |
| 29 | 6-$OC_6H_{11}$ | —$C_6H_5$ | —$(CH_2)_3NHCOCH_3$ | H |
| 30 | 6-$CH_2NHCOCH_3$ | —$C_6H_5$ | —$(CH_2)_3NHCOCH_3$ | H |
| 31 | 6-$OC_2H_5$ | —$C_6H_5$ | —$(CH_2)_3NHCOCH_3$ | H |
| 32 | 6-$OC_2H_5$ | —$C_6H_5$ | —$CH_2CH_2CONH_2$ | H |
| 33 | 6-$OC_2H_5$ | —$C_6H_4$-p-$CH_3$ | —$CH_2CH_2CONH_2$ | H |
| 34 | 6-$OC_2H_5$ | —$C_6H_4$-p-$OCH_3$ | —$CH_2CH_2CONH_2$ | H |
| 35 | 6-$OC_2H_5$ | —$C_6H_4$-p-Cl | —$CH_2CH_2CONH_2$ | H |
| 36 | 6-$OC_2H_5$ | —$C_6H_4$-p-$CH_3$ | —$(CH_2)_3NHCOCH(CH_3)_2$ | H |

TABLE—Continued

| Ex. No. | R¹,R² | R³ | R⁴ | R⁵ |
|---|---|---|---|---|
| 37 | 6-OCH₃ | —C₆H₅ | —(CH₂)₃NHCOCH₃ | 5-CH₃ |
| 38 | 6-OCH₃ | —C₆H₅ | —(CH₂)₃NHCOCH₃ | 6-CH₃ |
| 39 | 6-OCH₃ | —C₆H₅ | —(CH₂)₃NHCOCH₃ | 5-Cl |
| 40 | 6-OCH₃ | —C₆H₅ | —CH₂CH₂CON(CH₃)₂ | 5-Cl |
| 41 | 6-OCH₃ | —C₆H₅ | —CH₂CH₂CONHCH(CH₃)₂ | H |
| 42 | 6-OCH₃ | —C₆H₅ | —CH₂CH₂CONHC₆H₁₁ | H |
| 43 | 6-OCH₃ | —C₆H₅ | —CH₂CH₂CONCH₂CH₂OCH₂CH₂ | H |
| 44 | 6-OCH₃ | —C₆H₅ | —CH₂CH₂CONHC₆H₅ | H |
| 45 | 6-OCH₃ | —C₆H₅ | —CH₂CH₂CONHCH₂C₆H₅ | H |
| 46 | 6-OCH₃ | —C₆H₄-p-CH₃ | —(CH₂)₃NHCOCH₃ | 6-CH₃ |
| 47 | 6-CH₃ | —C₆H₅ | —(CH₂)₃NHCOOC₂H₅ | H |
| 48 | 6-OC₂H₅ | —C₆H₅ | —(CH₂)₃NHCOCH₂CH₂OH | H |
| 49 | 6-OC₂H₅ | —C₆H₅ | —(CH₂)₃NHCOC₆H₅ | H |
| 50 | 6-OC₂H₅ | —C₆H₅ | —(CH₂)₃NHCOCH₂C₆H₅ | H |
| 51 | 6-OC₂H₅ | —C₆H₅ | —(CH₂)₃NHCOCH₂C₆H₅ | H |
| 52 | 6-OC₂H₅ | —C₆H₅ | —(CH₂)₃NHCOCF₃ | H |
| 53 | 6-OC₂H₅ | —C₆H₅ | —(CH₂)₃NHCOCH(C₂H₅)(CH₂)₃CH₃ | H |
| 54 | 6-OC₂H₅ | —C₆H₅ | —(CH₂)₃NHCOCH₂OCH₃ | H |
| 55 | 6-OC₂H₅ | —C₆H₅ | —(CH₂)₃NHCOCH=CH₂ | H |
| 56 | 6-OC₂H₅ | —C₆H₅ | —(CH₂)CH₂CONHCH(CH₃)₂ | H |
| 57 | 6-OC₂H₅ | —C₆H₅ | —(CH₂)₃NHSO₂CH₃ | H |
| 58 | 6-OC₂H₅ | —C₆H₅ | —(CH₂)₃NHSO₂C₆H₄-p-CH₃ | H |
| 59 | 6-OC₂H₅ | —C₆H₅ | —(CH₂)₃NHCONHC₂H₅ | H |
| 60 | 6-OC₂H₅ | —C₆H₅ | —(CH₂)₃NHCOCH=CHCOOC₂H₅ | H |
| 61 | 6-OC₂H₅ | —C₆H₅ | —(CH₂)₃NHCOCH₂CH₂Cl | H |
| 62 | 6-OCH(CH₃)₂ | —C₆H₅ | —CH₂CH₂CONH₂ | H |
| 63 | 6-O(CH₂)₃CH₃ | —C₆H₅ | —CH₂CH₂CONH₂ | H |
| 64 | 6-OCH₂C₆H₅ | —C₆H₅ | —CH₂CH₂CONH₂ | H |
| 65 | 6-OCH₂C₆H₁₁ | —C₆H₅ | —CH₂CH₂CONH₂ | H |
| 66 | 6-OCH₂CH₂C₆H₅ | —C₆H₅ | —CH₂CH₂CONH₂ | H |
| 67 | 6-OCH₂CH(CH₃)₂ | —C₆H₅ | —CH₂CH₂CONH₂ | H |
| 68 | 6-OCH₂CH₂OH | —C₆H₅ | —CH₂CH₂CONH₂ | H |
| 69 | 6-OCH₃ | —C₆H₅ | —(CH₂)₃NHCOC=CH—CH=CH—O | H |
| 70 | 6-OC₂H₅ | —C₆H₅ | —(CH₂)₃NHCOC=CH—CH=CH—O | H |
| 71 | 6-CH₃ | —C₆H₅ | —(CH₂)₃NHCOCH₂OC₂H₄OH | H |
| 72 | 4,7-di-CH₃ | —C₆H₅ | —(CH₂)₃NHCOCH₃ | H |
| 73 | 4-Cl-5-CH₃ | —C₆H₅ | —(CH₂)₃NHCOCH₃ | H |

The novel azo compounds can be applied to polyamide textile materials according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pats. 3,100,134 and 3,320,021. The following example illustrates a method for applying the novel compounds to polyamide fibers.

EXAMPLE 74

The azo compound (16.7 mg.) of Example 1 is dispersed in 10 cc. of 2-methoxyethanol. A small amount (3–5 cc.) of a 3% sodium lignin sulfonate solution is added, with stirring, and then the volume of the bath is brought to 150 cc. with water. A 5 g. textile fabric made of nylon 66 fibers is placed in the bath and worked 10 minutes without heat. The bath is then slowly brought to the boil over a 30-minute period and the dyeing is carried out at the boil for one hour. The dyed fabric is then removed from the dyebath, rinsed with water and dried in an oven at 250° F. The fabric is dyed a bright shade of orange exhibiting excellent fastness properties when tested in accordance with the procedures described in the Technical Manual of the American Association of Textile Chemists and Colorists, 1968 edition.

The polyamide materials which can be dyed with the novel azo compounds are well known and include nylon 66 (polyhexamethylene adipamide) manufactured by the polymerization of adipic acid and hexamethylenediamine, nylon 6 (polycaprolactum) prepared from epsilon-aminocaproic acid lactum (caprolactum) and nylon 8. A detailed description of the synthetic polyamide materials which are dyed bright, fast shades by the compounds of the invention is set forth in U.S. Pat. 3,100,134.

The invention has been described in detail with particular reference to preferred embodiments thereof, but it will be understood that variations and modifications can be effected within the spirit and scope of the invention.

We claim:

1. A compound having the formula

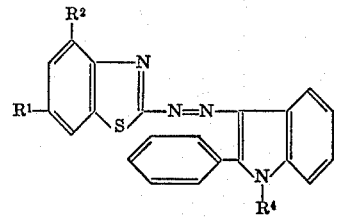

wherein
R¹ is hydrogen, lower alkyl, lower alkoxy, lower alkanoylamino, phenoxy, chlorine, bromine, lower alkoxyethoxy, lower alkoxypropoxy, lower alkylsulfonamidoethyl, lower alkylsulfonamidopropyl, lower alkanoylaminoethyl or lower alkanoylaminopropyl;
R² is hydrogen or, when R¹ is hydrogen, lower alkyl or lower alkoxy, R² can also be lower alkyl, lower alkoxy, chlorine or bromine; and
R⁴ is carbamoylethyl, lower alkanoylaminopropyl or lower alkoxycarbonylamino propyl.

2. A compound according to claim 1 wherein R¹ is methyl, methoxy or ethoxy; R² is hydrogen; and R⁴ is carbamoylethyl or acetamidopropyl.

3. A compound according to claim 1 having the formula

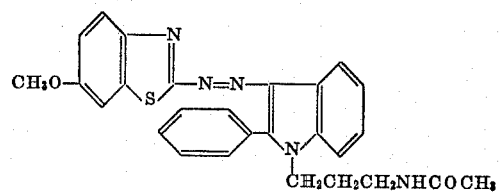

4. A compound according to claim 1 having the formula

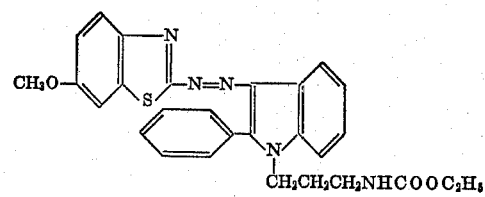

5. A compound according to claim 1 having the formula
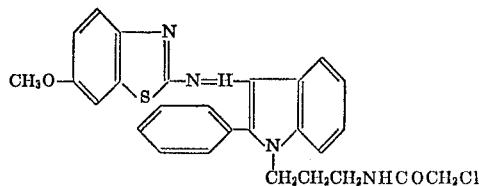
6. A compound according to claim 1 having the formula
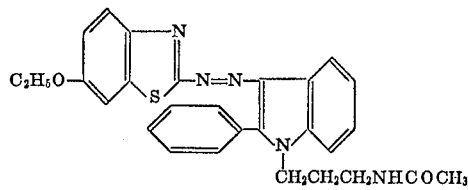
7. A compound according to claim 1 having the formula
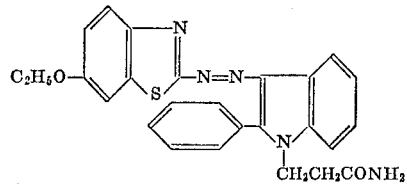
References Cited
UNITED STATES PATENTS
3,255,173  6/1966  Dehnert et al. ____ 260—158 X
3,136,751  6/1964  Iizuka et al. _____ 260—158
3,415,807  12/1968  Fisher et al. _____ 260—158
LEWIS GOTTS, Primary Examiner
C. F. WARREN, Assistant Examiner
U.S. Cl. X.R.
8—41 B; 260—305, 326.12 R, 326.13 R

PO-1050
(5/69)

UNITED STATES PATENT OFFICE
CERTIFICATE OF CORRECTION

Patent No. 3,759,895      Dated September 18, 1973

Inventor(s) Clarence A. Coates, Jr. and Max A. Weaver

It is certified that error appears in the above-identified patent and that said Letters Patent are hereby corrected as shown below:

Column 4, line 19, delete "N-(3-chloroacetamidropyropyl)-2-phenylindole" and insert ---N-(3-chloroacetamidopropyl)-2-phenylindole---.

Columns 5 and 6, in the Table, Example 43, under the heading $R^4$, delete $-CH_2CH_2CONCH_2CH_2OCH_2CH_2$ and insert --- $-CH_2CH_2CONCH_2CH_2OCH_2CH_2$ ---.

in the Table, Example 69, under the heading $R^4$, delete $-(CH_2)_3NHCOC=CH-CH=CH-O$ and insert --- $-(CH_2)_3NHCOC=CH-CH=CH-O$ ---.

in the Table, Example 70, under the heading $R^4$, delete $-(CH_2)_3NHCOC=CH-CH=CH-O$ and insert --- $-(CH_2)_3NHCOC=CH-CH=CH-O$ ---.

Signed and sealed this 16th day of April 1974.

(SEAL)
Attest:

EDWARD M.FLETCHER,JR.
Attesting Officer

C. MARSHALL DANN
Commissioner of Patents